Aug. 17, 1926.

E. VION

COMPASS FOR NAVIGATION PURPOSES

Filed April 1. 1924 5 Sheets-Sheet 1

1,596,639

Witnesses:

Inventor:
Eugène Vion
Fred F. Barlow
per
Attorney

Aug. 17, 1926.

E. VION 1,596,639

COMPASS FOR NAVIGATION PURPOSES

Filed April 1, 1924     5 Sheets-Sheet 2

Aug. 17, 1926.  
E. VION  
1,596,639  
COMPASS FOR NAVIGATION PURPOSES  
Filed April 1, 1924    5 Sheets-Sheet 3

*Fig. 5.*

Aug. 17, 1926.
E. VION
1,596,639
COMPASS FOR NAVIGATION PURPOSES
Filed April 1, 1924   5 Sheets-Sheet 4
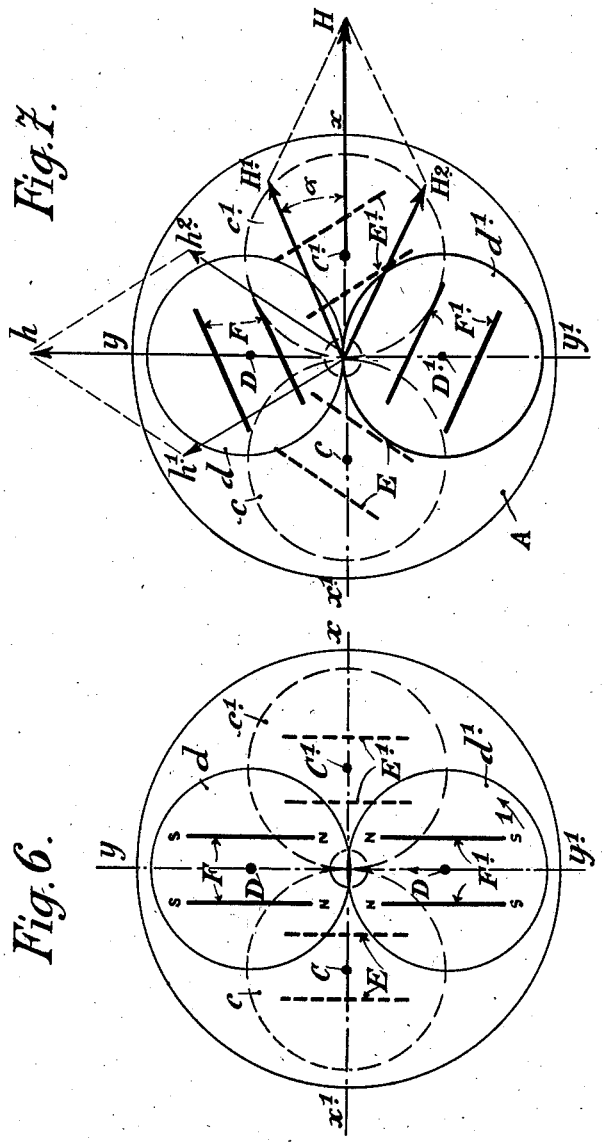
Witnesses:
Inventor:
Eugene Vion Aug. 17, 1926.

E. VION

COMPASS FOR NAVIGATION PURPOSES

Filed April 1, 1924    5 Sheets-Sheet 5

1,596,639

Witnesses:

Inventor:
Eugène Vion
per
Attorney

Patented Aug. 17, 1926.

1,596,639

UNITED STATES PATENT OFFICE.

EUGÈNE VION, OF PARIS, FRANCE.

COMPASS FOR NAVIGATION PURPOSES.

Application filed April 1, 1924, Serial No. 703,488, and in France April 10, 1923.

On board ship and on aircraft, in order to annul semi-circular deviation due to the permanent field of the rim it has been proposed to employ a cylindrical rod, placed vertically under the centre of the compass card and supporting two collars adapted to slide along the said rod. These two collars carry respectively longitudinal and transverse compensating magnets and may be locked at any point on the rod, by means of a set screw. The variation in intensity of the compensating field is obtained by increasing or diminishing the distance of the compensating magnet from the centre of the card, by sliding the collars along the rod.

Again it has been proposed to place compensating magnets in longitudinal and transverse openings in the compass casing. In this instance there are a certain number of longitudinal and transverse openings located at various distances from the centre of the card. The intensity of the compensating field varies according to the opening employed, and the number of bars inserted therein.

Again it has been proposed in order to annul the quadrantal deviations due to the induction of the horizontal component of the terrestrial field in the soft iron of the rim, to employ spheres, cylinders or bars of soft iron, placed in the plane of the magnets of the card and arranged symmetrically with respect to the plane of the latter. To annul the quadrantal deviations, it is necessary, after having suitably arranged the compensating masses with respect to the axis of the vessel, to bring them to a suitable distance from the centre of the card, which involves a regulation by horizontal translation of the compensating masses.

It has been proposed to employ a bar arranged horizontally under the casing of the compass. After putting the bar in position, the regulation is obtained by moving this bar nearer to or further away from the magnets of the card in a vertical direction.

These known arrangements have the double disadvantage that they are inconvenient in use, and that they often require more space than is available, especially on certain aircraft for use in war, and in particular upon fighting monoplanes. This is the case because if the quadrantal deviations reach an important amount, globes having a diameter greater than 0.30 m., must be used. Moreover devices, which are to give sufficiently precise results, generally require very delicate manipulation.

The compensating devices which form the subject of the present invention, both that intended to annul the deviation due to the permanent field of the rim and that intended to annul the deviation due to the induced field in the iron of the rim by the horizontal component of the terrestrial field, are based upon the same novel principle.

The invention enables all vertical or horizontal movement of the attracted masses or soft iron to be dispensed with, thus facilitating the adjustment of the compensating device, while at the same time diminishing its bulk.

According to the invention, each compensator consists of two or more units—each of which units may comprise one or more magnets or soft iron masses—such units being arranged together in pairs, with the units of each pair so mounted and intergeared that they can be adjusted in equal and opposite angular directions about an axis passing through the axis of the rose or parallel thereto.

The regulation of the compensating parts thus only requires displacements in angular directions, which can be effected from operating devices in a convenient and accurate manner, the parts displaced remaining moreover at a constant height in the apparatus, which reduces the size of the latter.

The theoretical principles applied in the new device for compensating semi-circular deviations may be explained with reference to Figs. 1 and 2.

In Fig. 1, O is the centre of the rose, O—$x$, O—$y$ are two axes, one of which O—$y$ is supposed to be directed towards the front of the ship or aircraft, on which the compass is mounted, whilst the other O—$x$ is supposed to be directed towards the right hand.

O—$h$ represents the horizontal component of the magnetic field, fixed with respect to the vessel, which is due to both the permanent field of the rim, and to the induced field in the iron in the latter owing to the vertical component of the terrestrial magnetic field.

It is evident that to annul the semi-circular deviations one may either annul O—$h$ or its components O—$h_x$ and O—$h_y$, in the zone of movement of the rose.

The device for annulling according to the invention, each of the fields $O-h_x$ and $O-h_y$, comprises two parts pivotally movable either directly or through their supporting means around a pivot which may be common to the two elements or individual to each element, so that they can thus be set at variable angular distances apart, each element being constituted by a magnet or a pair of magnets.

As shown at Fig. 2, by means of two magnets or two groups of magnets placed at invariable distances from the centre O of the rose, there may be produced in the latter fields $O-h_1$ and $O-h_2$ which may be equal or different, constant in magnitude but variable in direction and having a resultant $O-h$.

The two magnets or groups of magnets may in practice be mounted on a common support or in distinct supports, attached or not to the casing of the compass, connected to or independent of one another.

It is obvious that two angles $a_1$ and $a_2$ may be found such that the resultant of the three fields $O-h_1$, $O-h_2$ and $O-h_y$ is zero. In the same manner the field $O-h_x$ can be annulled.

A practical method of constructing such a compensating device for semi-circular deviations is shown in detail at Figs. 3–7 inclusive.

Fig. 5 is a bottom plan.

Figs. 6 and 7 show diagrammatically two different positions of the two groups of compensating magnets, respectively for a zero compensating effect for the groups of magnets F and $F^1$, a maximum for the groups of magnets E and $E^1$, and a compensating effect comprised between zero and the maximum.

Figure 3:
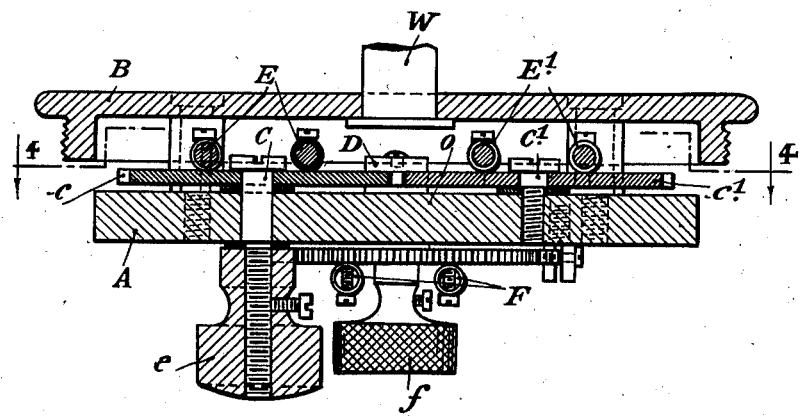
Fig. 3 is a longitudinal sectional elevation of an apparatus constructed according to the invention for compensating semicircular deviation.

Referring to Fig. 3 A is a circular disc attached to the base B of the compass box or in any other suitable position, parallel to the said base, and so that its geometrical axis passes through the centre of the rose. This disc A carries the pivots C, $C^1$ of the two groups of magnets by the angular displacement of which the component $O-h_y$ of the fixed field is compensated and the pivots D, $D^1$ of the two groups of magnets by the relative angular displacement of which the component $O-h_x$ is compensated.

The axes of the pivots C, $C^1$, D, $D^1$ are equidistant from the center O of disc A, the pivots C, $C^1$ being on the axis $x-x^1$, and the pivots D, $D^1$ on the axis $y-y^1$ passing through O and perpendicular to $x-x^1$.

On the pivots C, $C^1$ are keyed two toothed wheels of the same diameter ($c$ and $c^1$ respectively) meshing with one another, and located on the upper surface of the disc A. On the pivots D and $D^1$ are keyed two toothed wheels of the same diameter ($d$ and $d^1$, respectively) located on the lower surface of the said disc and meshing one with the other.

The wheels $c$ and $c^1$ act as supports respectively for two magnets E and $E^1$ or pairs of magnets, each pair being of course replaceable by a single magnet. In the same way the wheels $d$ and $d^1$ act as supports for magnets or pairs of magnets F, $F^1$.

The magnets of each pair are located symmetrically with respect to the axis of the pinion forming the corresponding pivot. The magnets are moreover so mounted that the magnets F are parallel to the axis $y-y^1$ at the same time that the magnets $F^1$ are parallel to that axis. Similarly the magnets E and $E^1$ are at the same time parallel to the axis $x-x^1$. It follows from the above that by means of a manipulating button $e$ keyed on one of the axles C or $C^1$ for instance on the axle C, a simultaneous displacement of the two groups E and $E^1$ can be effected through the same angle but in opposite directions with respect to the axis $x-x^1$. Similarly by means of a button $f$ keyed on one of the axles D or $D^1$ the axle $D^1$ for instance, a simultaneous angular displacement of the magnets or pairs of magnets F, $F^1$ can be produced, through the same angle and in opposite directions with respect to the axis $y-y^1$.

One of the axes, for instance $y-y^1$, is set parallel to the longitudinal plane of the ship or aircraft, and is consequently parallel to the lubber's line. Furthermore the four poles opposite one another must be of the same sign.

When the magnets F, $F^1$ are parallel to $y-y^1$ (the position shown in Figs. 1 to 6 inclusive) the north poles N of the magnets F being opposite the north poles N of the magnets $F^1$, the field produced by them at the centre of the rose is zero, in other words these magnets do not exert any compensating action upon the rose. But if, by manipulating the button $f$ the wheel $d^1$ is turned in the direction of the arrow 1, Fig. 5 there is produced at the centre of the rose, a field parallel to $x-x^1$ and in the direction $x-x^1$, and this field increases from zero to a maximum while the wheels $d$ and $d^1$ and the magnets F and $F^1$ carried thereby turn through a quarter of a revolution, until they are parallel to the axis $x$—$x^1$.

Fig. 7 shows diagrammatically an intermediate position of the magnets F and $F^1$ in which the latter are producing at the centre of the rose a field the two horizontal components O—$H^1$ and O—$H^2$, which are equal and symmetrical with respect to the axis $x$—$x^1$, these components furnishing a resultant O—H along O—$x$.

When the angle $\alpha$ which the magnets F make with the axis $x$—$x^1$ is equal to 90° (the position in Fig. 6) the resultant O—H is zero. This resultant will be in the direction O—$x$ for a value of $\alpha$ less than 90°, it will be in the direction O—$x^1$ for a value of $\alpha$ greater than 90°.

O—H will be a maximum either positive or negative according to the direction of rotation when the magnets are turned parallel to $x$—$x^1$.

By manipulating the button $e$ to turn simultaneously in opposite directions the magnets E and $E^1$, there is obtained in the same way (Fig. 7) a resultant O—$h$ for the two fields O—$h^1$ and O—$h^2$. This resultant will vary in magnitude between zero and a positive or negative maximum, and will be in the direction O—$y$ or O—$y^1$ according to the angle of direction and the direction of rotation.

In general by the simple manipulation of the buttons $e$ and $f$, which is an easy and precise operation, the permanent field of the rim is annuled in the zone occupied by the rose, by annulling the two components of the field in succession. The compensating magnets always remain in the same plane parallel to the rose, the compensating device occupies as little height as possible. One of the toothed wheels or both of them may be provided with pawl mechanisms to ensure the stopping of the corresponding magnets in the desired positions.

Figure 4:
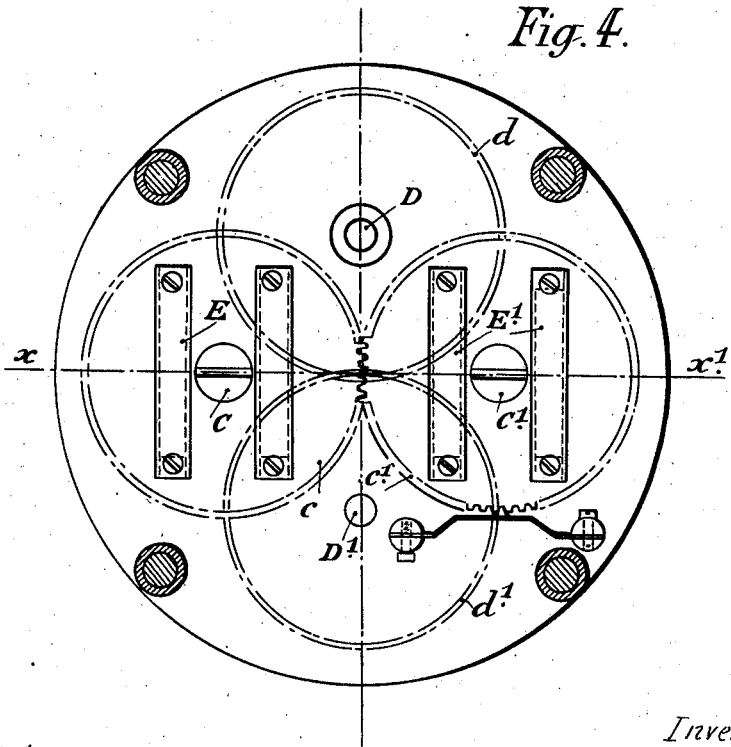
Fig. 4 is a sectional plan, on the line 4—4, Fig. 3.

The accompanying drawing shows by way of example at Figs. 4 and 5 a pawl mechanism including a detent $g$ projecting from a flexible blade G the ends of which are attached on the disc A, which detent is constantly in engagement with the teeth of the wheel to be held in position.

It is evident that the very practical arrangement of the magnets E and $E^1$ and F and $F^1$ respectively on the upper and lower surfaces of the same disc is not the only possible way of applying the principle of the invention. For each group E, $E^1$ and F, $F^1$ a separate support might be provided and an appropriate part of the box or casing or any other suitable portion of the apparatus might be used as the support.

The manipulation buttons $e$, $f$ might be furnished on the part visible on the outside with lines or markings for facilitating the adjustment of the compensating magnets, corresponding to similar markings on the disc A. These buttons might also be furnished with graduations.

The device for compensating quadrantal deviations makes use of the same novel principles as the device for compensating semi-circular deviations just described, that is to say the compensating masses of iron are divided into two groups, between which around a pivot passing through the centre of the rose, a variable angular separation is produced, the soft iron compensating devices being placed in the known manner horizontally beneath the rose.

It is obvious that in certain types of compass, especially those for instance which enable reading to be effected from the side, the soft iron masses could be located without inconvenience beneath the rose.

Figure 1:
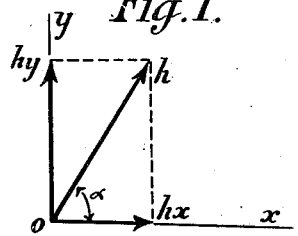
Figure 2:
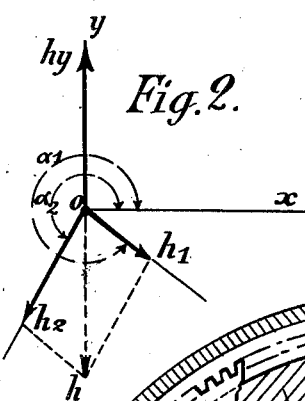
Figure 8:
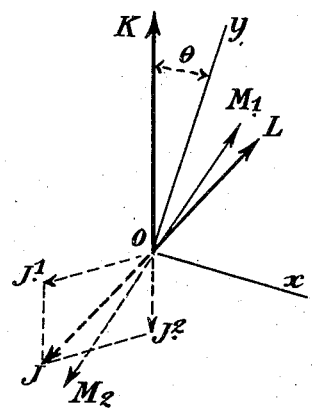
Fig. 8 is a theoretical diagram in reference to the means for compensating quadrantal deviations.

In the theoretical Figure 8, $O_y$, $O_x$ represents again respectively an axis directed towards the front of the ship or aircraft, and an axis perpendicular thereto and turned towards the right hand side. O—K represents the horizontal component of the terrestrial field. O—L represents the rotary field, of constant intensity, due to the induction in the soft iron masses of the rim produced by the component O—K.

It is known from the theory of deviation that O—L will always turn with respect to the axis O—$y$ through an angle, which is equal to that through which the said axis turns with respect to O—K. To annul the field O—L there is created by means of soft iron masses a field O—J equal and opposite to the said field. The direction of the field O—J is regulated with respect to that of the field O—L, by regulating suitably the direction of the axis of symmetry of soft iron compensating masses with respect to the axis of the vessel.

With the known compensating devices the magnitude of the field O—J is determined by moving the soft iron masses towards or away from the centre of the rose by communicating to them a vertical or horizontal movement of translation.

According to the invention, the compensating iron is divided into two elements or groups of elements, adapted according to their distance apart and their position with respect to the axis O—$y$, to produce two components O—$J^1$ and O—$J^2$ giving a resultant O—J variable in direction and variable in magnitude between zero and a positive or negative maximum; the said resultant annulling of course the effects of the field O—L.

If the magnitude angle is denoted by $\theta$ it is known that the quadrantal deviation $\delta$ may be expressed by the formula $$\delta = P \sin 2\theta + Q \cos 2\theta$$

where P and Q are coefficients. If we give to these coefficients the respective values $$P = M \cos \alpha \text{ and } Q = M \sin \alpha$$

then we shall obtain $$\delta = M \sin (2\theta + \alpha)$$

Figure 9:
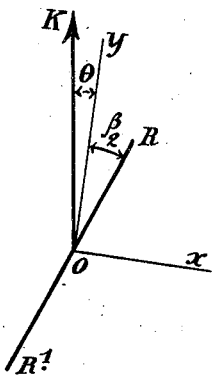
Fig. 9 is another theoretical diagram, further illustrating such compensating means.

In the theoretical Fig. 9, O—K represents the horizontal component of the terrestrial field, O, the centre of the rose and R—R, a bar of soft iron placed horizontally under the rose and at a short distance therefrom.

$\theta$ is the magnetic angle and $\frac{\beta}{2}$ the angle (O$y$—OR).

O$_y$ and O$_x$ still denote the axes of reference O$_y$ turned forwards and O$_x$ towards the right.

The bar R, R is under the influence of two substantially opposite fields, the terrestrial field and the field produced by the needles of the rose. By reason of the short distance of the bar from the centre of the rose, the influence of the field produced by the needles preponderates, the result is a deviation of the form $$\delta = a \sin (2\theta + \beta)$$

The coefficient $a$ denotes the power of the bar. This coefficient depends upon the size of the bar and its distance from the needles of the rose.

If—

$$\sin (2\theta + \beta) = 1 \text{ we have } \delta = a$$

The power of a bar of a given size placed at a determined distance (care having been taken to remove to a distance any mass causing disturbances) is therefore the maximum quadrantal deviation which it can produce and the angle $\beta$ denotes the position of the bar with respect to the axes of reference, for $$O_y - OR \frac{\beta}{2}.$$

Now we know that a bar of soft iron placed very close to the magnets of the rose produces an octantal deviation which can be regarded as due to a rotary field O M$^1$ analogous to O L of constant intensity, but when O$_y$ turns through an angle $\theta$ with respect to O K, O—M$^1$ turns through $3\theta$ with respect to O$_y$ the deviation $\delta$ will be given by the formula $$\delta = b \sin (4\theta + \alpha)$$

the definition of $b$ being analogous to that of $a$.

It can be easily seen that a bar of the same power as the first, making with the latter an angle of 45° will produce a field of O M$^2$ which will always be equal and opposite to O M$^1$ whatever the value of $\theta$.

Once again, according to the invention, to annul the octantal produced by a single bar, this latter is replaced by two bars of equal power, the axes of which are at an angle of 45° to one another.

By these means an octantal deviation may even be annulled which would result from the induction of the iron masses of the rim by the horizontal component of the terrestrial field.

An octantal deviation $\rho$ will be produced which will annul at all magnet angles the octantal deviation $\rho$ by suitably turning the two bars inclined to one another at any desired angle.

Figure 10:
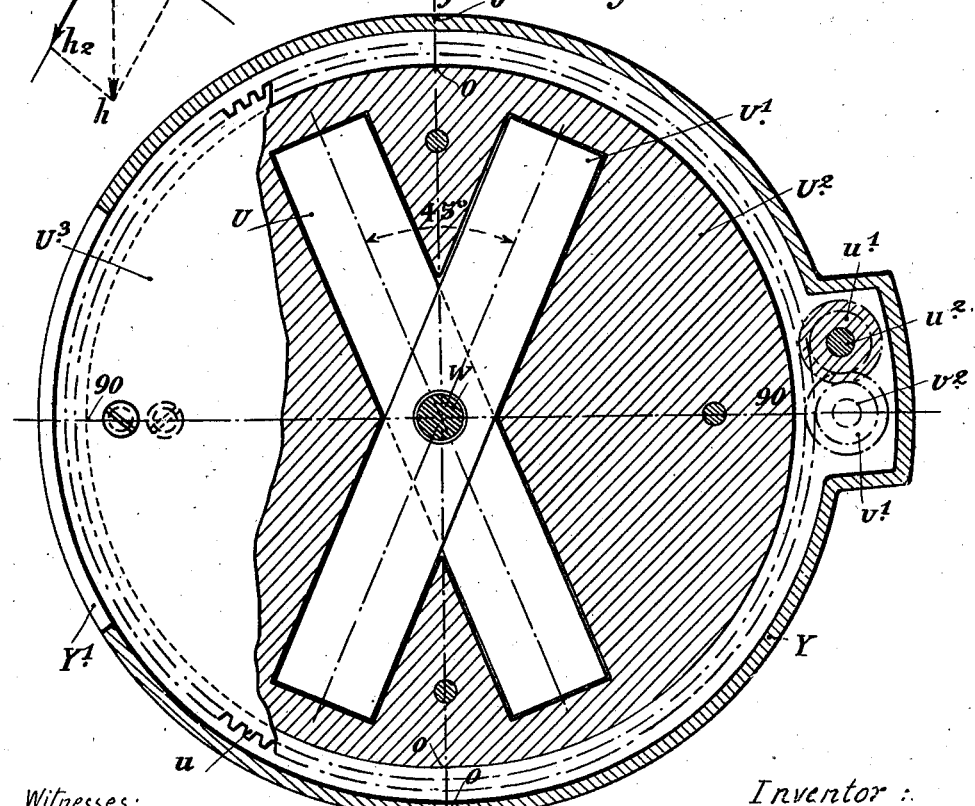
Fig. 10 is a plan, partly in section, of a practical form of apparatus for correcting quadrantal and octantal deviations.
Figure 12:
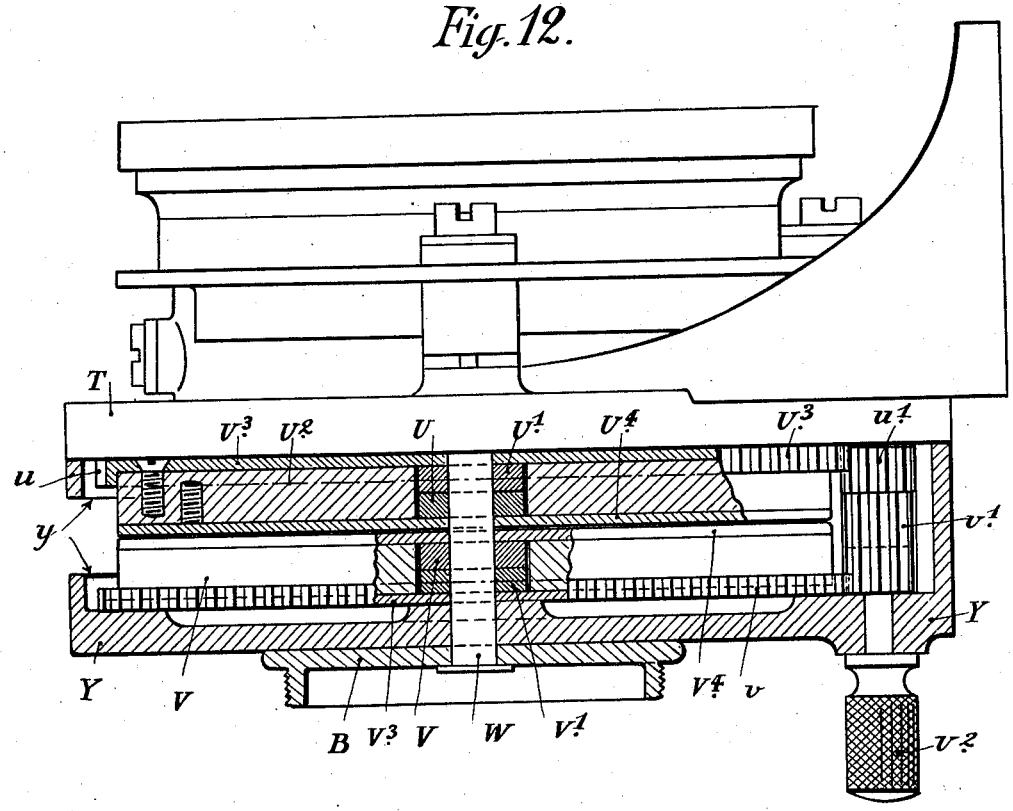
Fig. 12 is a view partly in elevation and partly in section of the said apparatus.
Figure 11:
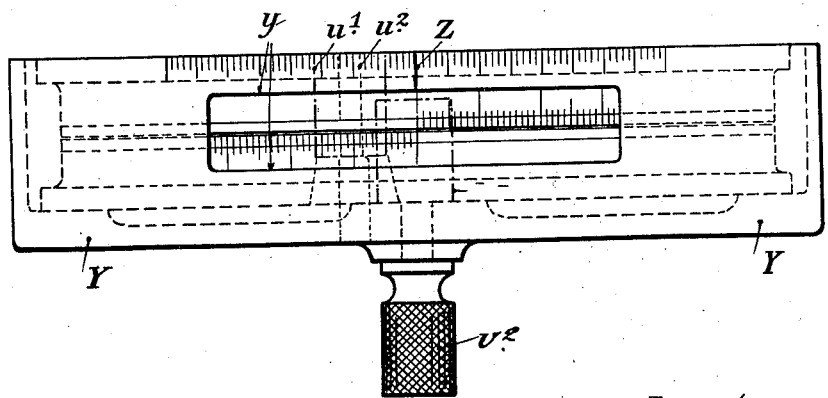
Fig. 11 is an elevation of a portion of the last mentioned apparatus.

Figs. 10 to 12 inclusive show respectively in plan, in elevation and in sectional elevation, a constructional embodiment of the compensating device, the principle of which has just been explained.

Fig. 12 shows the device under the support T of the rose, between the latter and the device for correcting the semi-circular deviations.

The two soft iron bars V—V$^1$, U—U$^1$ the simple angular separation of which is designed to produce the variable resultant equal and of opposite sign to the deviation due to field produced in the soft iron masses of the rim, are each composed of two elements or groups of elements arranged for example at 45° to one another. These elements may with this end in view, be superposed at their middle on a common axle W carried by a support T and placed on a recess of X shape, the arms of which are inclined at 45° to one another. The recess for elements U and U$^1$ is provided in a disc U$^2$ clamped by means of screws between two other discs U$^3$ and U$^4$, the disc U$^3$ being provided with a toothed annulus $u$. The elements V and V$^1$ are in the same way located in a recess in the disc V$^2$ mounted on the same axle W and clamped between two discs V$^3$ and V$^4$, the lower disc V$^3$ being provided with a toothed annulus V.

The systems of bars U, U$^1$ and V, V$^1$, crossing at an angle of 45° are mounted at an invariable distance from the rose, for instance as shown at Fig. 12, below the support T. The toothed discs in which the said systems of bars are located are held in a casing Y movable around the axle W.

It will be understood that the bars U and U$^1$ which may be constituted by laminæ of varying number, are of such importance that each has the same action on the rose. Similarly with the bars V and V$^1$. The whole device U, U$^1$ must moreover produce the same quadrantal deviation as the whole device V—V$^1$. As has been shown above the systems of bars U—U$^1$ and V—V$^1$ at angles of 45° to one another, produce at every instant octantal deviations the algebraical sum of which is zero.

The mechanism for displaying simultaneously and in opposite directions the systems U, U¹ and V, V¹ may comprise as shown at Figs. 10 to 12, a pinion $v^1$ keyed on an axle mounted in bearings in the casing Y and having a button $v^2$ for operating it. The pinion $v^1$ engages on the one hand the toothed annulus $v$ of the support for these systems V, V¹ and on the other hand with a similar pinion loose on an axle $u^2$ carried by the casing Y, and engaging with the toothed annulus $u$.

The vertical walls of the plates U² and V² may have graduations visible through an opening $y$ in the casing Y On the outer wall of the casing scales may be engraved in degrees from zero to 45 in opposite directions on each side from a common zero placed at Z (Fig. 11), the position of which is $x$—$x^1$ and $y$—$y^1$, when these latter are parallel, in other words when the two systems U, U¹ and V, V¹ are superposed, the axis $x$—$x^1$ of the lower plate corresponding then with the axis $y$—$y^1$ of the upper one. At this moment the compensating power of the two systems is a maximum.

On turning the two systems equally in opposite directions by means of the button $v^2$ (i. e. the system U, U¹ with respect to the system V, V¹), the compensating force is decreased progressively from this maximum until it becomes zero when the system V, V¹ is at 90° with respect to the system U, U¹.

The whole casing Y and the two discs U², U⁴, and V², V³ which carry the groups or systems of irons U, U¹ and V, V¹ is movable on the apparatus around the axle W on each side of the mean position through an angle of about 45° not shown being provided for holding the casing in any intermediate position.

Again, pawl or other locking mechanism may be provided for locking the operating button $v^2$ on the casing Y in any adjusted position. The milled head V² might for example carry a spring embracing its axle and normally engaging by means of a tooth with a recess upon the casing.

What I claim and desire to secure by Letters Patent in the United States of America is:—

1. An apparatus for compensating the deviations of a compass for a ship or aircraft, including a compass casing, a rose, supporting means in connection with the compass casing, pairs of compensating masses pivotally mounted on the said supporting means, so that they can turn in a plane parallel to the plane of the rose and move symmetrically with respect to and on opposite sides of the axis of the rose, and means for operating the elements of a pair so that they can be simultaneously adjusted in equal and opposite angular directions with respect to a plane of the axis of the rose.

2. An apparatus for compensating the semicircular deviations of the compass for a ship or aircraft, including a compass casing, a rose, supporting means in connection with the compass casing, a pair of axles carried by the said supporting means, vertical to the plane of the rose and at equal distances from the axis of the rose and on an axis of reference passing through the axis of the rose and directed fore and aft with respect to the vessel, another pair of axles also at equal distances from the axis of the rose and on an axis of reference at right angles to the first mentioned axis of reference and passing through the axis of the rose, compensating magnets carried by the said axles, the poles of the said magnets being symmetrically arranged with respect to the axes of reference, and means for rotating the axles of each pair so that the magnets are moved in equal and opposite angular directions with respect to the axes of reference, substantially as described.

3. An apparatus for compensating the semicircular deviations of the compass for a ship or aircraft, including a support carried by the compass casing, a pair of pivots carried by the said supporting means vertical to the plane of the rose at equal distances from the axis of the rose and on an axis of reference passing through the axis of the rose, another pair of pivots also at equal distances from the axis of the rose and on an axis of reference at right angles to the first mentioned axis of reference and passing through the axis of the rose, intermeshing gear wheels mounted on the pivots of each pair, the wheels of each pair being of equal diameter, compensating magnets carried by the gear wheels, with the poles symmetrically arranged with respect to the axes of reference and means for rotating the wheels of each pair so that the magnets are moved in equal and opposite angular directions with respect to the axis of reference, substantially as described.

4. In apparatus of the type described, the combination with means for compensating semicircular deviations, of means for compensating quadrantal and octantal deviations, such means including two systems of soft iron bars arranged in X formation, both systems being mounted so that they can turn pivotally about the axis of the rose and symmetrically with respect to two rectangular axes of reference through the axis of the rose and in a plane parallel to the rose, and means for rotating the said systems in equal and opposite angular directions for the purposes set forth.

In witness whereof I affix my signature.

EUGÈNE VION.